United States Patent
Gezari

[19]

[11] Patent Number: 5,810,125
[45] Date of Patent: Sep. 22, 1998

[54] ACTIVE SHOCK-ABSORBING SEATING SYSTEM

[75] Inventor: Walter A. Gezari, Calverton, N.Y.

[73] Assignee: Stidd Systems, Inc., Greenport, N.Y.

[21] Appl. No.: 715,764

[22] Filed: Sep. 19, 1996

Related U.S. Application Data

[60] Provisional application No. 60/004,125, Sep. 22, 1995.
[51] Int. Cl.$^6$ .............................. B63B 17/00; F16F 9/18; B60G 17/00
[52] U.S. Cl. .................. 188/266.2; 114/363; 248/550; 267/136; 267/117; 267/131; 296/65.1; 188/378; 188/266.1
[58] Field of Search .................. 188/299.1, 266.1–266.7, 188/378–380, 280; 248/550, 566, 631; 180/282; 296/65.1; 114/363; 244/122 R; 267/136, 131, 117; 280/707; 701/49

[56] References Cited

U.S. PATENT DOCUMENTS

| | | | |
|---|---|---|---|
| 3,430,444 | 3/1969 | Kamp | 267/117 |
| 4,363,377 | 12/1982 | Van Gerpen | 248/550 |
| 4,887,699 | 12/1989 | Ivers et al. | 267/136 |
| 5,463,972 | 11/1995 | Gezari et al. | 114/363 |

Primary Examiner—Douglas C. Butler
Attorney, Agent, or Firm—Schweitzer Cornman Gross & Bondell LLP

[57] ABSTRACT

An active shock-absorbing boat seat system has a seat system mounted to the boat deck through an active shock absorber. Sensors monitor both the shock to be passed from the deck to the seat as well as the shock actually received by the seat after passing through the shock absorbing system. A controller monitors the shock levels and provides a continuing control signal to the shock-absorbing unit to control the response of the shock-absorbing unit during the duration of the shock. The control system can provide for adjustment of various operating parameters for the system, including initial position of the seating system, overall ride stiffness, maximum allowable shock, and other parameters.

6 Claims, 3 Drawing Sheets

ACTIVE SHOCK-ABSORBING SEATING SYSTEM

The present application claims the priority of Provisional Patent Application 60/004,125 filed Sep. 22, 1995.

The present invention relates to a new and improved seating system, such as may be utilized in a marine environment, able to absorb shocks transmitted to the seat system from the structure to which the seat is affixed.

BACKGROUND OF THE INVENTION

High-speed, high-performance watercraft, as used in both military and civilian applications, subject the passengers to repetitive high G-forces resulting from the sudden deceleration of the watercraft as it hits waves while going at a high forward speed and a high angle of attack. Such repetitive impacts are both debilitating to the watercraft's occupants, preventing them from carrying out their tasks, and further may result in physical injury.

It is thus a purpose of the present invention to provide a seating system which is capable of counteracting such impact motion, substantially preventing the resulting forces which are transmitted to a seat occupant through the seat structure, from reaching the seat and its occupant.

Another purpose of the present invention is to provide a shock-absorbing seating system the response of which is adjustable to accommodate a range of seat and load weights as well as expected impact forces.

Still a further purpose of the present invention is to provide such a seating system which can be adjusted to provide a first level of shock absorption during normal operating conditions and an increased level of shock absorption during high stress periods.

BRIEF DESCRIPTION OF THE INVENTION

In accordance with the foregoing and other purposes and objects, the present invention provides a seat which is coupled to the watercraft frame through the deck or other structure through which impact forces would reach the seat through a series arrangement which includes an actively controlled hydraulic cylinder and piston. Relative motion of the cylinder and piston provide damping of the forces which would be otherwise transmitted by the seat by a solid connection between the seat and watercraft frame. The variable cylinder volume is connected to a hydraulic control system which allows for controlled passage of hydraulic fluid into and out of the cylinder. Sensing components monitor the forces applied to the watercraft frame as well as forces passed to the seat through the coupling cylinder-piston system. By monitoring and comparing these forces, appropriate control signals are generated which modulate the flow of hydraulic fluid to and from the cylinder. Such controlled transfer, which can be initiated at the onset of a transmitted force, provides control over the relative movement between the cylinder piston and cylinder during the duration of the impulse force, thus changing the degree of coupling between the seat and the watercraft, and accordingly providing for controlled damping or "softening" of the transmission of the force from the watercraft to the seat.

The sensing of the forces can be accomplished by a variety of systems, including accelerometers coupled to both the seat and deck, as well as by sensors adapted to monitor pressure differentials between different portions of the hydraulic system coupled to the cylinder and piston. The sensing and resulting compensation can be performed on a real-time basis, using either analog or digital control and processing components, thus allowing active and continuous hydraulic system pressure adjustment and control over the varying forces applied to the watercraft and transmitted to the seat during watercraft operation.

In order to provide a high level of reliability for the system, an active heat exchanger is provided for cooling of the hydraulic fluid in conjunction with a parallel flow path manifold. The manifold provides coupling between the various elements of the hydraulic system simplifying and minimizing the amount of discrete piping required, and also assists in heat dissipation from the hot hydraulic fluid by facilitating transfer between hot and relatively cool portions of the flow, and by serving as a heat sink, dissipating the heat to the atmosphere. Primary heat dissipation is provided by an active heat exchanger, using water as the coolant, and which is preferably located directly adjacent the hydraulic cylinder, coupled to the portion of the hydraulic line feeding the cylinder. The combination of manifold and heat exchanger minimizes the volume of hot fluid in the system, thus assuring that the fluid does not overheat.

BRIEF DESCRIPTION OF THE DRAWINGS

A fuller understanding of the present invention will be accomplished upon consideration of the following, detailed description of an illustrative embodiment thereof, when considered in association with the annexed drawings, wherein.

DETAILED DESCRIPTION OF THE INVENTION

Investigations have shown that G-force loads produced during operation of high-speed watercraft can reach 8 G, typically increasing in a linear fashion from 0 to 8 Gs in approximately 80 milliseconds, and subsequently linearly returning to zero G over a similar period of time. The present invention uses the controlled flow of hydraulic fluid from a piston-cylinder system coupled between a watercraft seat and the watercraft to damp such G-forces transmitted to the seat such that the force reaching to the seat can represent upwards of approximately 75% decrease in the applied force.

Figure 1:
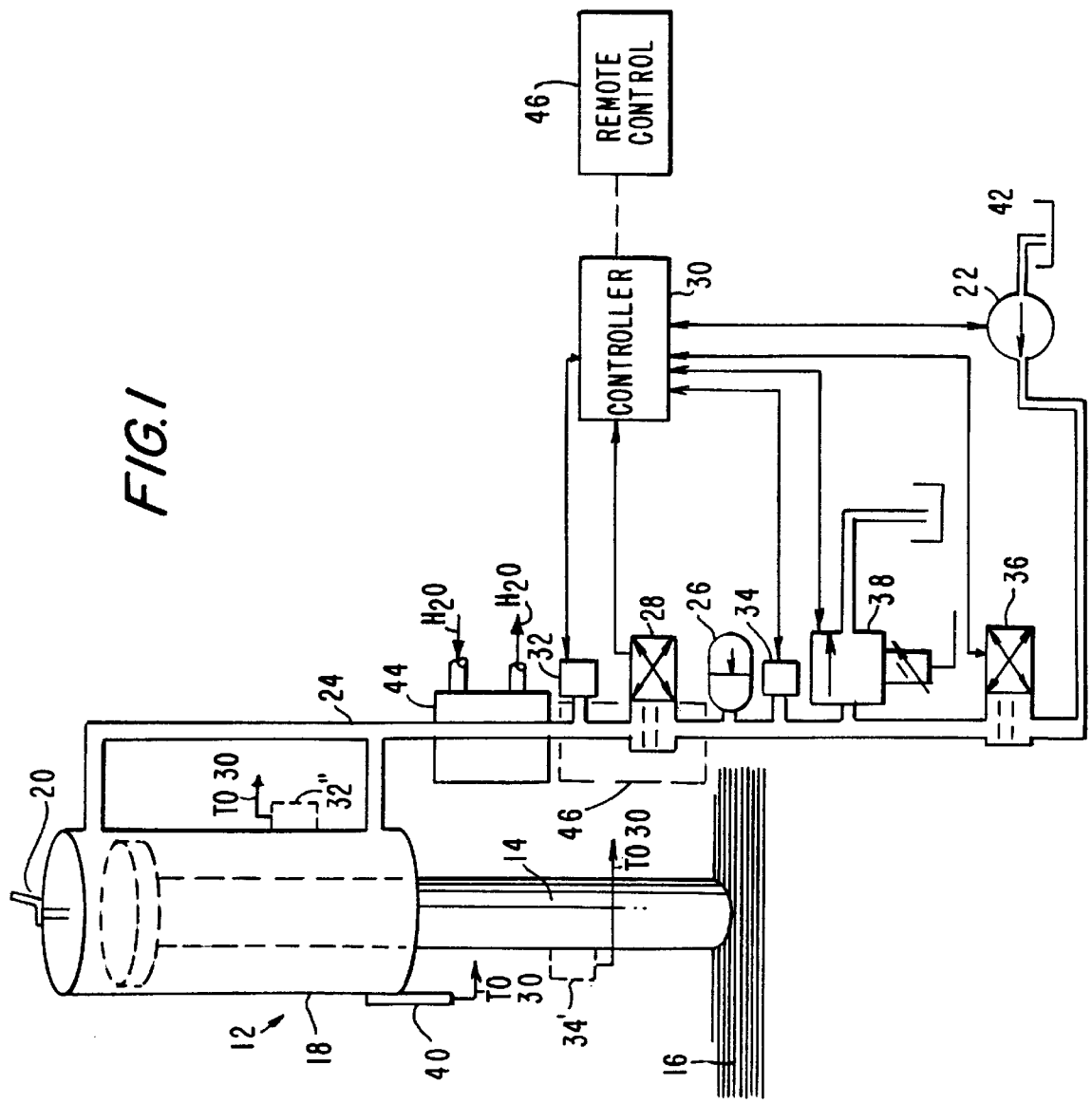
FIG. 1 is a schematic representation of an embodiment of an embodiment of the present invention utilizing hydraulic pressure sensing.

As shown in FIG. 1, the present invention 10 includes a main hydraulic cylinder unit 12, the piston 14 of which is connected to the watercraft deck 16 with its main longitudinal axis extending along the line, typically vertical, of the expected forces. As known, the piston 14 lies within the cylinder 18, to which is coupled the watercraft's seat 20 intended to be protected from the applied high G forces. Initial pressurization of the cylinder unit is provided by pressure source 22, having a fluid supply 42, coupled to the cylinder through appropriate piping 24.

The hydraulic system piping couples the cylinder unit to accumulator 26, which as known in the art may be a tank divided by an internal piston into two chambers, the first of which is charged with nitrogen or other similar gas to a given pressure, the second portion of which is coupled to the piping 24 supplying the hydraulic cylinder. Pressure and volume changes in the hydraulic cylinder-piston unit are transmitted by the hydraulic fluid to the accumulator 22, which serves as a collection point for the hydraulic fluid displaced from the hydraulic cylinder 18 as the piston 14 rises in the cylinder, and as a source for hydraulic fluid when the effective volume of the cylinder increases as the piston retracts. The accumulator also allows the initial pressure of the hydraulic system to be adjusted by adjusting the pressure in the gas-charged chamber.

Because the forces sought to be damped are typically of the short duration, impulse type, the rate by which hydraulic fluid is transferred between the cylinder and the accumulator during the duration of the force controls the degree of coupling between the seat and watercraft, effectively adjusting the response or "stiffness" of the seat system to the force. This fluid transfer is controlled by ride control valve 28, which is located in series in the piping between the cylinder and the accumulator. The greater the valve opening, the more rapidly hydraulic fluid can transfer between the cylinder and accumulator during the impulse, and thus the softer the response of the system, as the relatively non-restricted flow of fluid allows for similarly non-restricted relative motion between the cylinder and piston to absorb and thus damp the effects of the applied force. With the valve fully closed, the cylinder is isolated from the accumulator. With no flow being permitted, no relative motion or damping occurs and there is complete coupling, and thus no shock absorption, between the seat and the deck. With the valve fully open, maximum fluid transfer, relative motion, and thus damping can occur during the duration of the force.

The ride control valve 28 is controlled by a controller 30, to be subsequently discussed in greater detail, which controls the overall operation of the system. Monitoring of the applied forces to the seat may be carried out by seat sensor 32, which is depicted as a hydraulic system pressure sensor located in the piping between the hydraulic cylinder and the ride control valve 28. Monitoring of the applied forces to the watercraft proper, and thus the deck, may be carried out by a similar hydraulic system pressure sensor 34 in the hydraulic line downstream of the ride control valve 28. Alternative means of sensing the forces may be employed, such as accelerometers 32' and 34', shown in phantom, which may be coupled to cylinder 18 and piston 14, respectively. Both the pressure sensors 32 and 34, as well as accelerometers 32' and 34' are responsive to one-axis forces directed along the axis of the piston. Controller 30 analyzes the force/acceleration data transmitted by the sensors 32 and 34 (or 32' and 34'), and adjusts ride control valve 28 in response thereto, thus controlling the passage of hydraulic fluid and thus the transfer of pressure differences between the hydraulic cylinder and the accumulator.

A second control valve, tare control valve 36, is located in the fluid supply line adjacent the pressure source 22. This valve allows for initial loading of the cylinder, allowing the hydraulic system to be filled to the amount required to place the piston in its normal position within the cylinder, taking into account the load to be applied to the seat. Once the system is properly pressurized, tare valve 36 is closed to isolate the system from the pressure source 22 and fluid supply 42. A pressure relief valve 38 is also provided in the supply line, and is set to vent the system in the event of pressure overload.

Operation of the shock absorption system commences by loading the hydraulic cylinder to its operating pressure and placing the cylinder and the seat to which it is mounted to maximum height corresponding to complete filling of the cylinder. With a 2 inch diameter piston having a stroke length of 8 inches, initial system pressure, corresponding to a seat and load weight or tare of between about 495 and 1320 pounds, can be accomplished through a pressure range of between 300 and 800 psi. The pressure in accumulator 28 is set through a control circuit incorporated into controller 30 which compares a reference voltage generated by a set point adjustment to the output of pressure sensor 34. When alternative force sensors, such as accelerometers 32' and 34' are utilized, a separate pressure sensor may be employed for overall system pressure monitoring. The controller operates tare control valve 36, allowing fluid source 42 to supply the necessary fluid to bring the system to the appropriate pressure.

It is contemplated that the gain of the tare control system is to be relatively low, since stability, rather than precise regulation, is desirable for this aspect of the system. The tare control system also controls the setting for pressure relief valve 38, which is set to relieve pressure at a point just slightly above the tare set point. In addition, the relief valve 38 is preferably configured to operate only when the cylinder 18 and the connected seat system 20 is at the extended, top of stroke position, or when the system is first energized and initial pressure applied. Once the initial pressure is established, the relief valve is normally disabled, although it may be used on a demand basis to reduce the initial tare setting on demand by the operator.

Upon system activation, the hydraulic system quickly reaches equilibrium, with the pressure throughout the system being the same. During operation, controller 30 compares the forces applied to the deck and the seat 20, either through the outputs of the accelerometers 32' and 34' or by monitoring the pressure difference across the ride control valve 28 by comparing the pressure-derived signals from sensors 32 and 34. Commencing from system equilibrium, the condition equating to a watercraft free from shock-inducing forces, when the pressure sensed by the seat pressure sensor 32 exceeds that sensed by accumulator pressure sensor 34, resulting from a G-force shock being applied to the cylinder and seat system causing the piston to rise within the cylinder and generating a pressure wave in the fluid traveling from the cylinder through the hydraulic system, ride control valve 28 is operated, under the supervision of controller 30, to quickly "vent" this additional pressure pulse through the hydraulic system to the accumulator by increasing the rate by which fluid can pass through the valve and thus into accumulator 26. The speed by which this venting occurs determines the response or softness of the system to the force.

Typically, the accumulator may be charged with dry nitrogen gas to about 300 psi, and has a 60 cubic inch volume. Its piston has an effective area of 1.65 square inches, with a stroke of about 7.5 inches. Such a stroke would vary the pressure by a factor of 1.26 to 2.22 at the end of the stroke. If ride control valve 28 were to fully open, allowing immediate and complete transfer of a maximum amount of hydraulic fluid into the accumulator, the cylinder could bottom out at forces of between 1 and 2 G. Thus, the valve must be fully controlled to limit the flow into the accumulator and thus be able to accommodate range of forces and vertical accelerations anticipated.

During normal, "low G" operation, ride control valve 28 is maintained just slightly open (about 20%). This level has been found to provide sufficient damping for a comfortable ride in relatively calm waters.

When controller 32 detects a sufficient force being applied to the seat, such as a result of the associated pressure differential across the ride control valve, indicating the onset of a force to be actively controlled, the controller is immediately placed into a "high G" mode, causing the valve to close momentarily. It is then reopened in a controlled manner by the controller 30 to regulate seat acceleration. When acceleration is determined by the pressure sensors 32, 34, the pressure as sensed by sensor 22 is controlled to be between 1 and 3 times the tare value. The specific limit for seat acceleration is a variable which may be set by the user. In accordance with this methodology, if the seat and load comprise a weight of 700 pounds, corresponding to an initial system pressure of 424 psi, system pressure may be initially set at 500 psi, with the cushioning level through pressure sensors to be set at 1.25 of the initial tare value, or 625 psi, representing a total load of 1031 pounds. Any increase above 1031 pounds, resulting from a G-force greater than 0.47 G, would cause the ride control valve 28 to open, allowing fluid to be directed into the accumulator 26 and the piston to more freely move in the cylinder.

As ride control valve 28 is under the active supervision of controller 30, it can react proportionally, depending upon the amplitude of the pressure difference across it. Thus, flow can increase as the force increases to increase decoupling between the seat and deck as the force peaks. For stability, the gain of the control system is preferably low, allowing valve 28 to fully open at a pressure value of approximately 20% above the set point. This typically limits G-forces to approximately 0.73 G. The tare value must be observed with respect to the setting of the original operational values. Setting the values at too low a level may allow the piston to bottom out during high G-forces. The higher the G-forces encountered, the higher the operational settings should be to prevent the piston from reaching its limit of travel.

It is to be appreciated that the valve 28 must be able to respond quickly and precisely to control signals provided to it by controller 30. An appropriate valve, as known in the art, with a response time of approximately 30 milliseconds can be chosen to allow a flow of 37 gallons per minute at 72 psi. Such flow rate is believed to be sufficient for adequate response to the impulse forces expected to be experienced.

In order to prevent bottoming out of the piston and cylinder under high G loads, linear displacement transducer 40 is coupled to the hydraulic cylinder 18, and monitors the relative position of the cylinder to the fixed piston. This value is compared to a limit entered into the controller, which limit may be user adjusted to define a maximum range of piston travel from about 5 to 7 inches. If the limit is reached, ride control valve 28 is immediately closed, resulting in an abrupt deceleration of the cylinder and seat, effectively "locking" the seat in place. A warning indicator may be provided to denote when such a condition is reached. As the G-force subsides, as monitored by the pressure across the ride control valve 28, or by the output of the accelerometer 32' and 34', the piston is reset to the top of its stroke by modulating ride control valve 28 to bring cylinder pressure back to the originally set tare value. When the force decays to zero, the pressure across the ride control valve will be equalized. The system then resets itself, valve 28 reopening to the preset position of approximately 20% open. This allows the increased accumulator pressure resulting from the G-forces to return the piston to the chosen maximum extension. The rate of return of the piston and seat may be controlled by a setting applied to controller 30 which controls the opening of ride control valve 28 and maintains a rate of return (as measured by linear displacement transducer 40) to the value set.

Controller 30 may be further programmed to detect when maximum extension of the piston is approached, controlling the ride control valve 28 to a "soft" approach to the maximum level. Typically, the controller 30 may be coupled to both ride control valve 28 as well as valve 36 by pulse width modulated valve controllers having outputs matched to the valves to which they are coupled. Ride control valve 28 may further be configured as a closed-loop spool position control, as known in the art, to compensate for any non-linearities of its positioning apparatus with respect to control current.

Because the operation of the system generates substantial heat within the hydraulic system, the present invention utilizes both an active heat exchange unit and a novel manifold to assist in heat dissipation and moderation. The heat exchanger 44 is preferably coupled about the hydraulic line leading to the cylinder as shown in FIG. 1. It is to be recognized that the cylinder may be of the self-compensating type allowing hydraulic fluid to be on both sides of the piston, the two (internal) hydraulic lines being joined together as depicted in the Figure. As there is no reliable air slipstream available for cooling in a marine environment, the heat exchanger utilizes water as the cooling medium. Preferably sea water is used, and is pumped through the heat exchanger through appropriate lines and inlet and outlet fittings.

Figure 3:
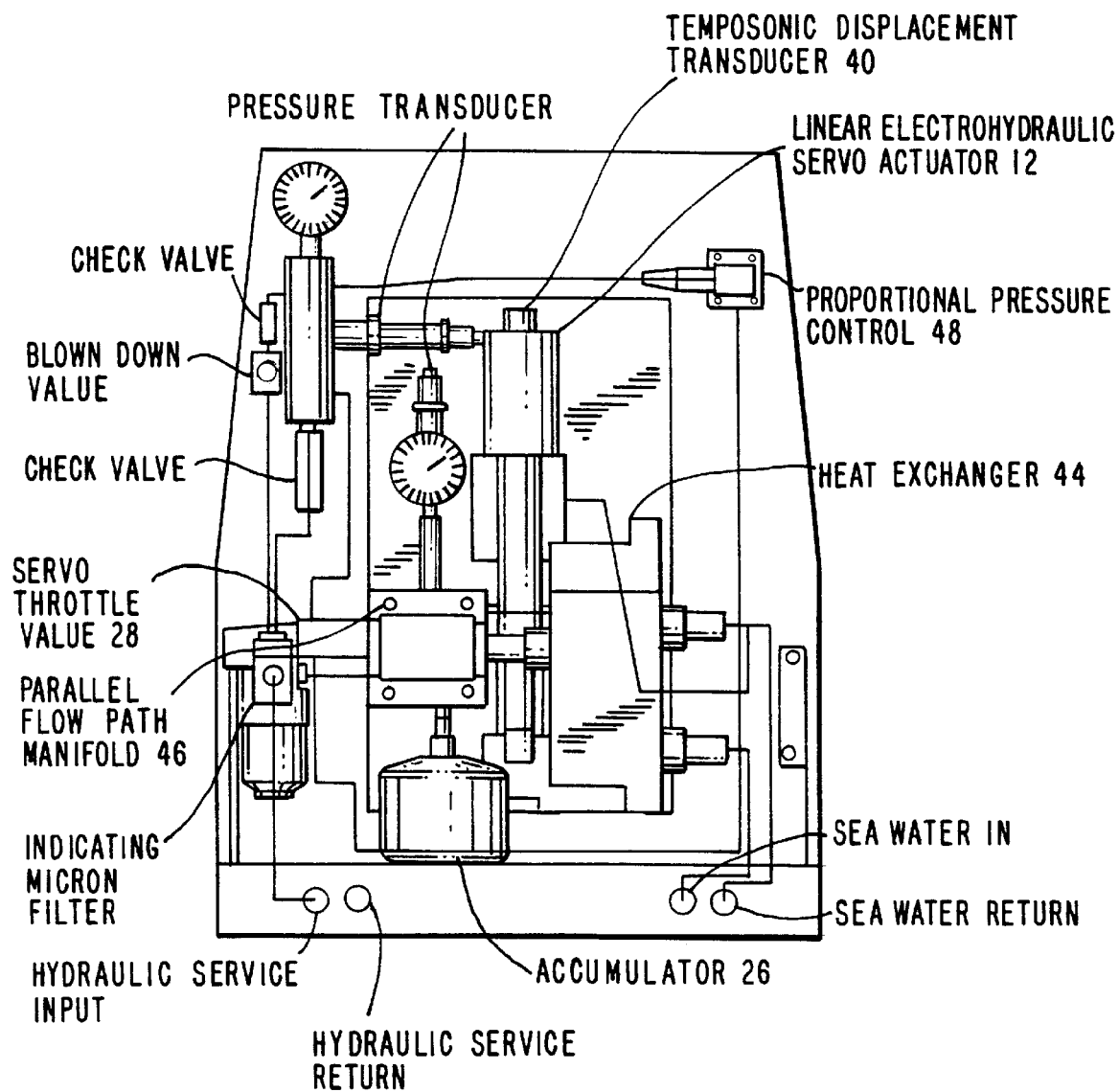
FIG. 3 is an elevation view representative of an embodiment of the invention depicting the relative positioning of the components.

Operating in tandem with the heat exchanger for heat dissipation and moderation is manifold 46, which may be seen in FIG. 3. The manifold incorporates substantial portions of the piping in the hydraulic system, typically providing the coupling between the ride control valve 28, accumulator 26, and the cylinder/heat exchanger 44 combination. The manifold may be formed from a block of aluminum, or a similar metal, and is provided with a plurality of bored passageways between its various faces as may be needed to couple the system components together. Because the manifold couples various of the components, the mass of the block serves as a heat transfer function, transferring heat from higher temperature portions of the hydraulic flow to lower temperature portions, thus moderating the overall temperature of the fluid. In addition, the mass of the block serves as a heat sink, dissipating the heat transferred to it by the hydraulic fluid to the atmosphere.

As shown in FIG. 3, the manifold may be physically located adjacent the heat exchanger 44, coupling it to the ride control valve 28. In addition, it may be seen to couple the other side of the ride control valve to accumulator 26. In conjunction with the heat transfer and loss associated with normal valve spool and piston seal leakage, the fluid loss of which may be replaced through sensing of pressure drop by proportional pressure control 46 coupled through the controller to the pressure source 22 and the tare valve 36, the combination of the manifold and heat exchanger is capable of maintaining system temperatures at acceptable levels over a wide range of anticipated operating levels.

Controller 30 may be formed of a plurality of analog control circuits as known in the art. Alternatively, a microprocessor may be utilized, which would allow further processing of G-force signals to be utilized to allow active tuning and compensation of the system during operation. For example, the experienced G-forces can be used to modify the initial settings on an ongoing basis to tailor the instantaneous response characteristics of the seat system to the G-forces actually being experienced. Whether of an analog or digital character, the control system and associated system components, may be powered by the watercraft's main power supply.

Figure 2:
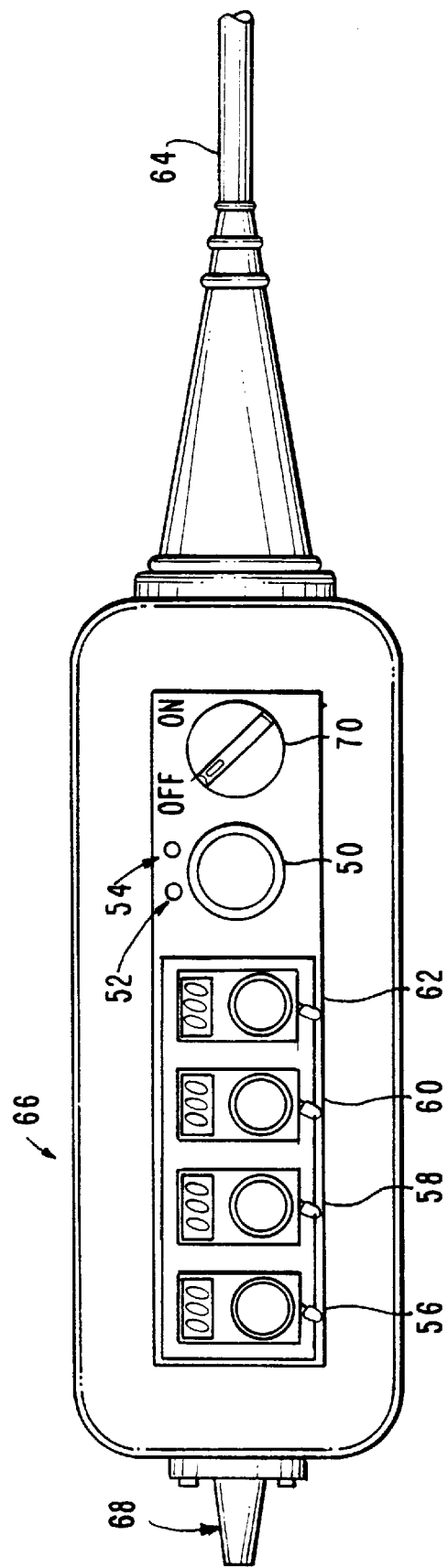
FIG. 2 is a representation of a control unit for the invention.

As there are several system variables which may be tuned by the user to optimize seat response to experienced conditions, a remote controller may be provided. As depicted in FIG. 2, such a remote controller may be in the form of a small, hand-held housing or chassis 46, having indicators and controls to allow the user to adjust the system settings as desired. In addition to a main power switch 44, it may include a system activation switch 72, which places the system into the active, sensing mode, along with indicators 52, 54 to indicate when the "high G" mode is entered and when the limit of travel for the cylinder is reached, respectively.

Four combined controls and indicators, 56, 58, 60 and 62 may also be arrayed on the housing, providing adjustment for tare, for maximum range of cylinder travel, for the onset of system control, for control of the "softness" of response, and for the rate of return to normal position after accommodating a shock. LED indicators may be associated with each of the controls used to provide numerical values for the settings entered. The controls may be coupled to the controller 30 by a cable 64. The housing may further be provided with a mounting ring 68 to allow the remote controller to be hung or otherwise mounted within reach of the user.

I claim:

1. A active shock-absorbing seating system for attenuating high-G shock forces comprising a seat; a mount for said seat coupling said seat to a shock-receiving platform; an adjustable shock-absorbing unit having first and second elements comprising said mount, said first 14 element being connected to the shock-receiving platform and said second element being connected to the seat; sensor means for monitoring shock forces applied to said shock-receiving platform and received by said seat; and control means coupled to said force sensor means and said shock-absorbing unit to vary the response of said shock-absorbing unit in response to shock forces applied to the shock-receiving platform.

2. The seating system of claim 1, wherein said control means comprises means to vary the response of the shock-absorbing unit during the duration of a shock force.

3. The seating system of claim 1, wherein said shock-absorbing unit is a hydraulic cylinder.

4. The seating system of claim 3, wherein said adjustable shock-absorbing unit further comprises an accumulator coupled to said hydraulic cylinder through a first valve, the operation of said valve being controlled by said controller.

5. The seating system of claim 4 further comprising a heat exchanger coupled to said adjustable shock-absorbing unit.

6. The seating system of claim 1, wherein said force means comprise accelerometers.

* * * * *